United States Patent
Chang et al.

(10) Patent No.: US 9,576,099 B2
(45) Date of Patent: Feb. 21, 2017

(54) MINIMIZING HARMFUL EFFECTS CAUSED BY RETICLE DEFECTS BY RE-ARRANGING IC LAYOUT LOCALLY

(71) Applicant: TAIWAN SEMICONDUCTOR MANUFACTURING COMPANY, LTD., Hsin-Chu (TW)

(72) Inventors: Shih-Ming Chang, Zhubei (TW); Chia-Hao Yu, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 254 days.

(21) Appl. No.: 14/195,006

(22) Filed: Mar. 3, 2014

(65) Prior Publication Data
US 2015/0248518 A1 Sep. 3, 2015

(51) Int. Cl.
G06F 17/50 (2006.01)

(52) U.S. Cl.
CPC ....... *G06F 17/5081* (2013.01); *G06F 2217/12* (2013.01); *Y02P 90/265* (2015.11)

(58) Field of Classification Search
CPC .... G03F 7/70; G06F 17/5045; G06F 17/5068; G06F 17/5072; G06F 17/5081
USPC .............. 716/50–52, 106–107, 110–112, 119
See application file for complete search history.

(56) References Cited

U.S. PATENT DOCUMENTS

| | | | | |
|---|---|---|---|---|
| 6,235,434 B1* | 5/2001 | Sweeney | ................ | B82Y 10/00 430/5 |
| 2005/0004774 A1* | 1/2005 | Volk | ................... | G01N 21/9501 702/108 |
| 2013/0017475 A1* | 1/2013 | Terasawa | ........... | G01N 21/8806 430/5 |
| 2013/0198697 A1* | 8/2013 | Hotzel | ..................... | G03F 1/24 716/51 |
| 2014/0242522 A1* | 8/2014 | Vannuffel | ................. | G03F 1/72 430/322 |
| 2015/0024307 A1* | 1/2015 | Vannuffel | ................. | G03F 1/72 430/5 |

* cited by examiner

*Primary Examiner* — Paul Dinh
(74) *Attorney, Agent, or Firm* — Haynes and Boone, LLP

(57) ABSTRACT

Provided is a method of fabricating a semiconductor device. An integrated circuit (IC) layout plan is obtained. The IC layout plan contains critical features and non-critical features. Locational information regarding a defect on a blank reticle is obtained. The blank reticle is a candidate reticle for being patterned with the IC layout plan. Based on the locational information regarding the defect and the IC layout plan, a determination is made that at some of the critical features will intersect with the defect if the blank reticle is patterned with the IC layout plan, regardless of whether the IC layout plan is globally manipulated or not before being patterned onto the blank reticle. In response to the determination, selected local portions of the IC layout plan are re-arranged such that none of the critical features will intersect with the defect if the blank reticle is patterned with the IC layout plan.

20 Claims, 13 Drawing Sheets

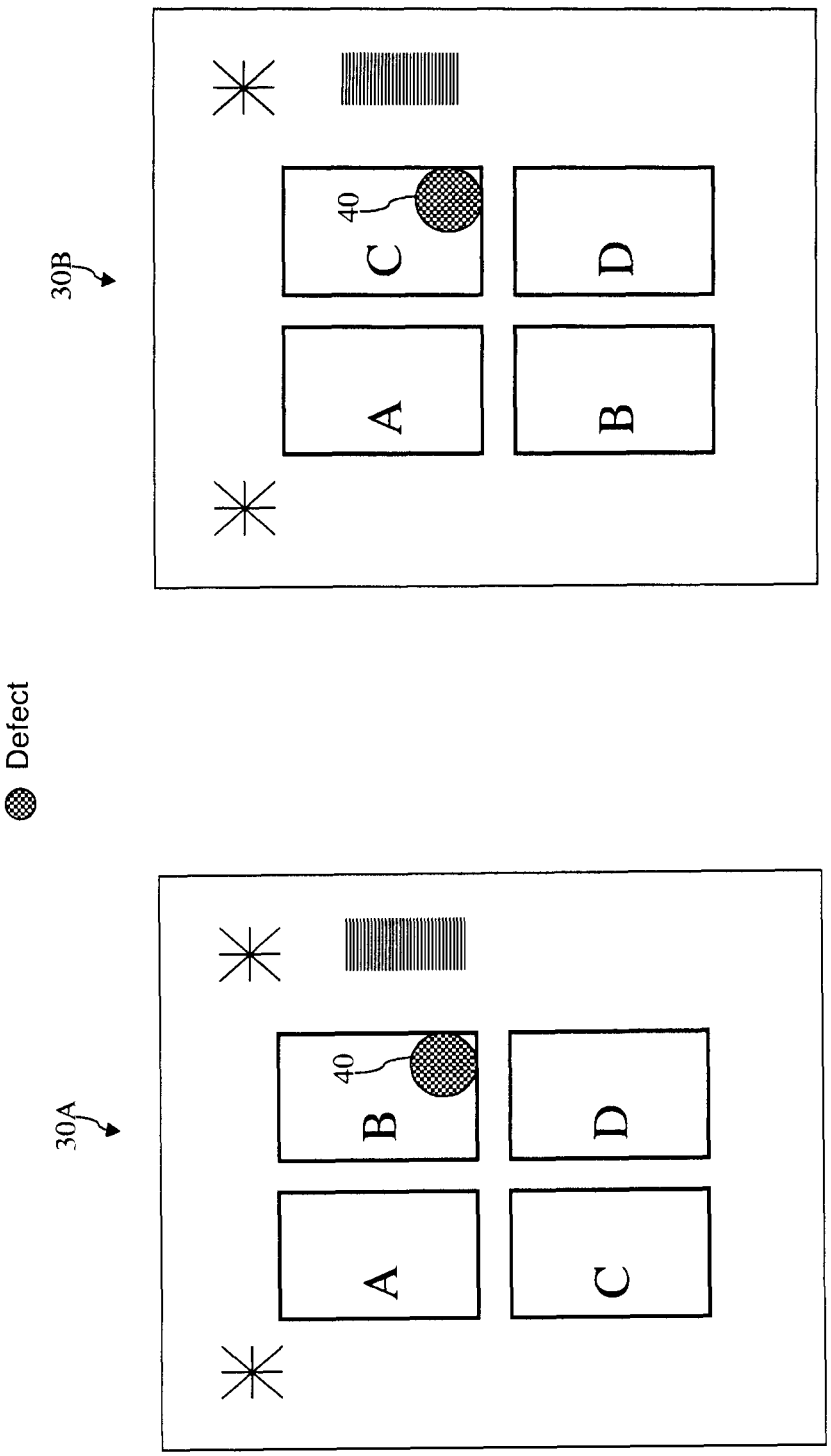

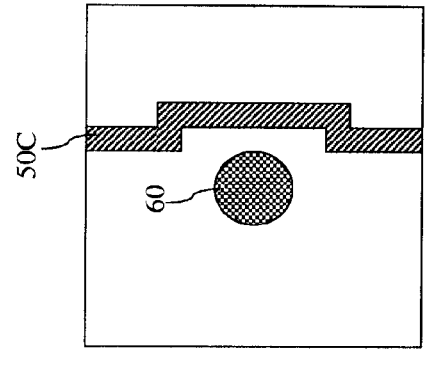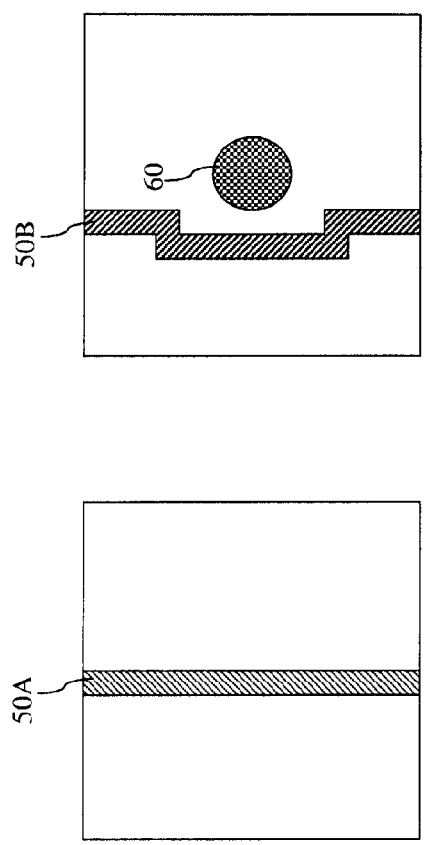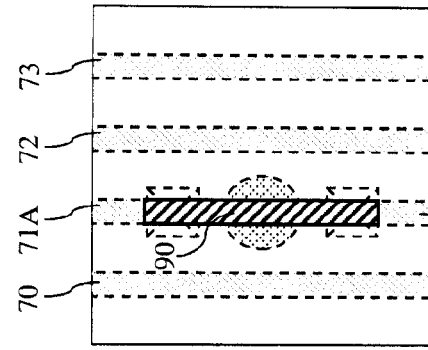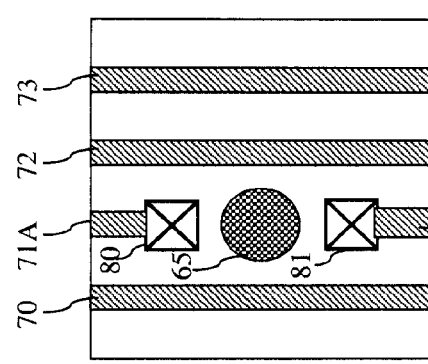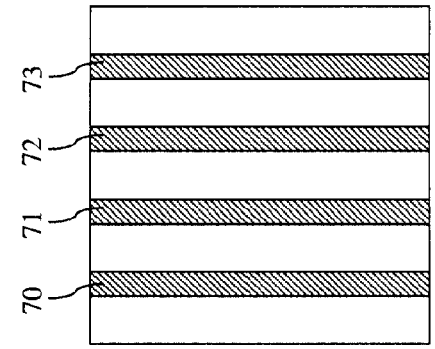

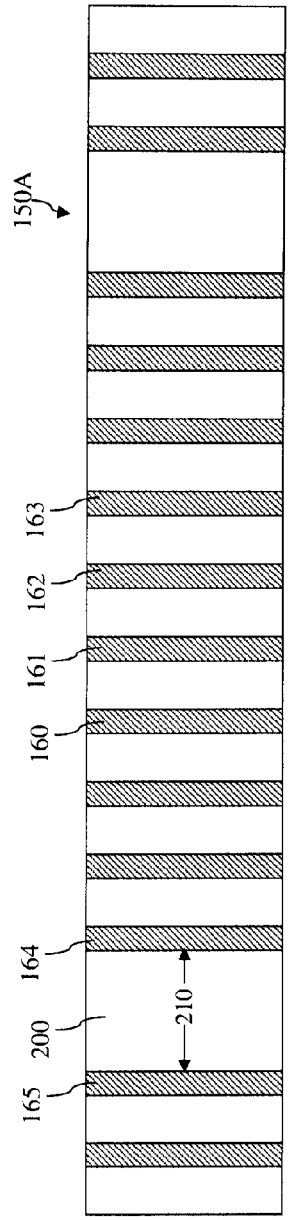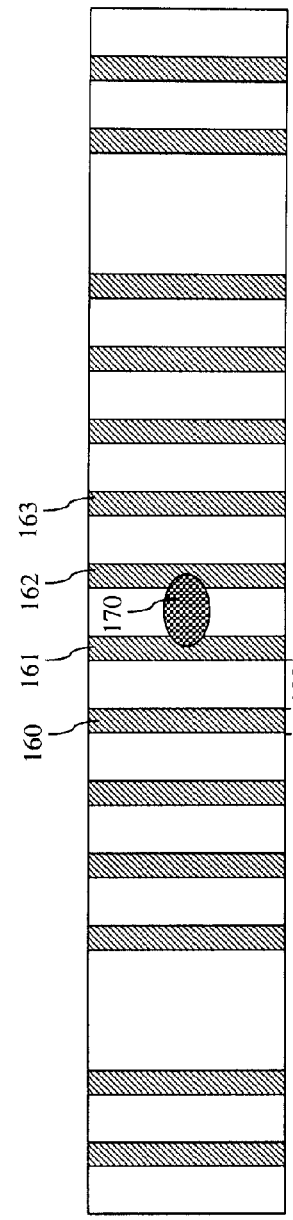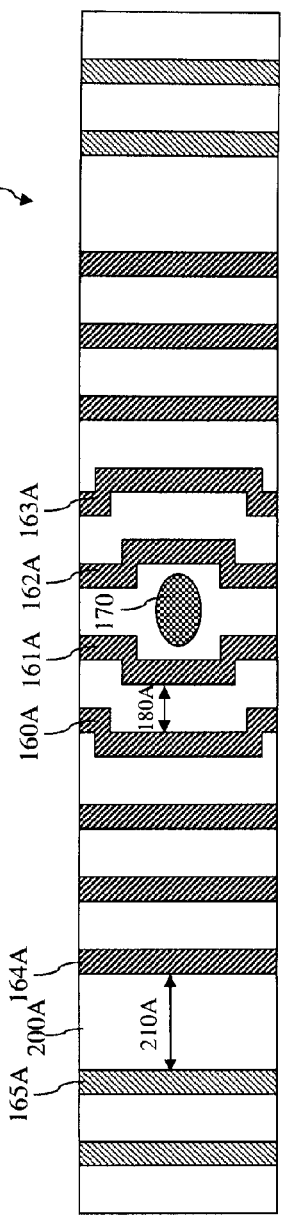

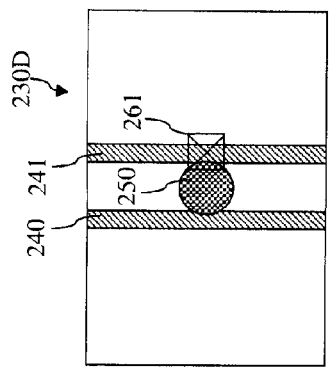
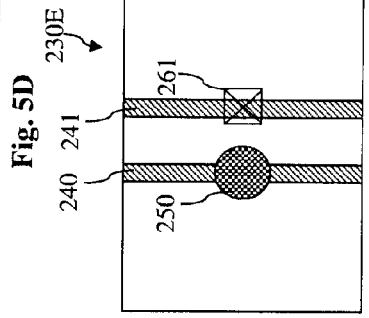
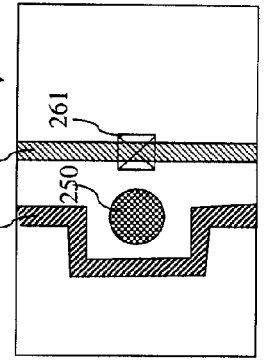
Fig. 5D  Fig. 5E  Fig. 5F
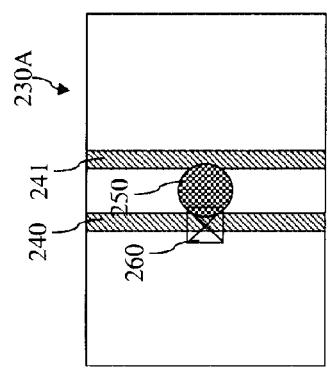
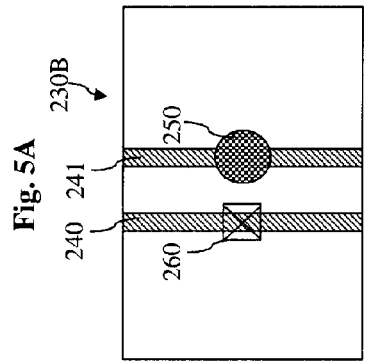
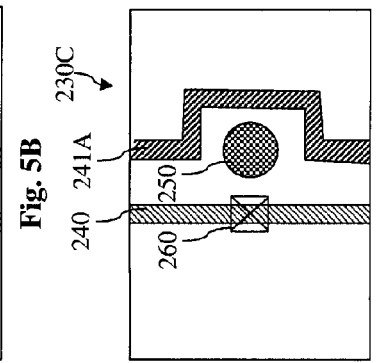
Fig. 5A  Fig. 5B  Fig. 5C

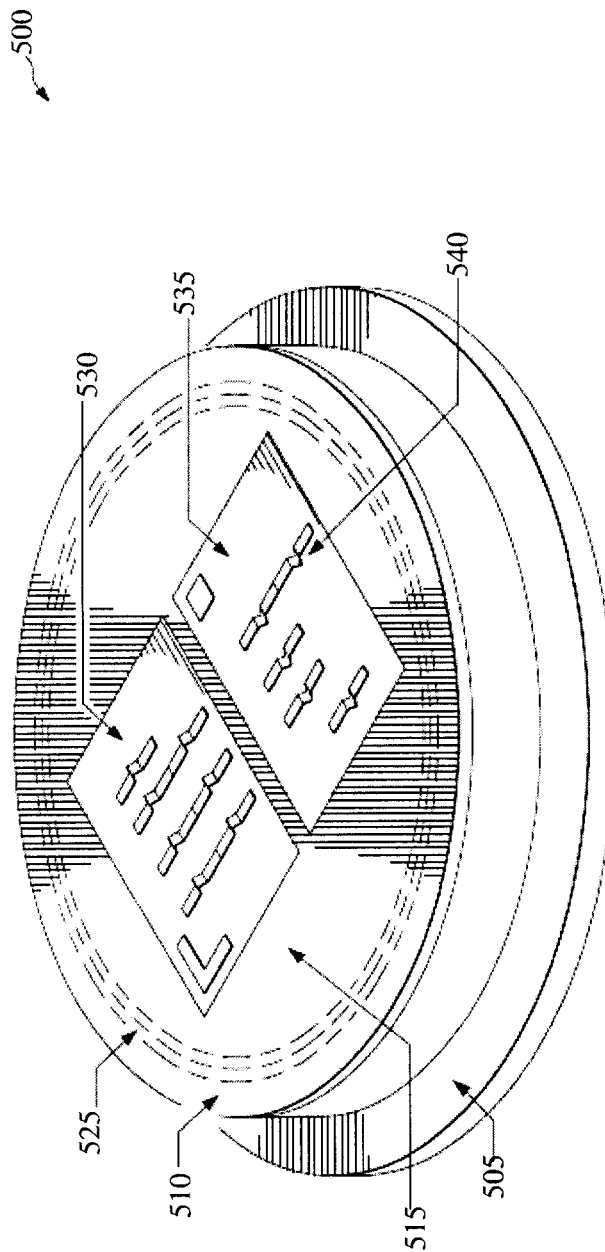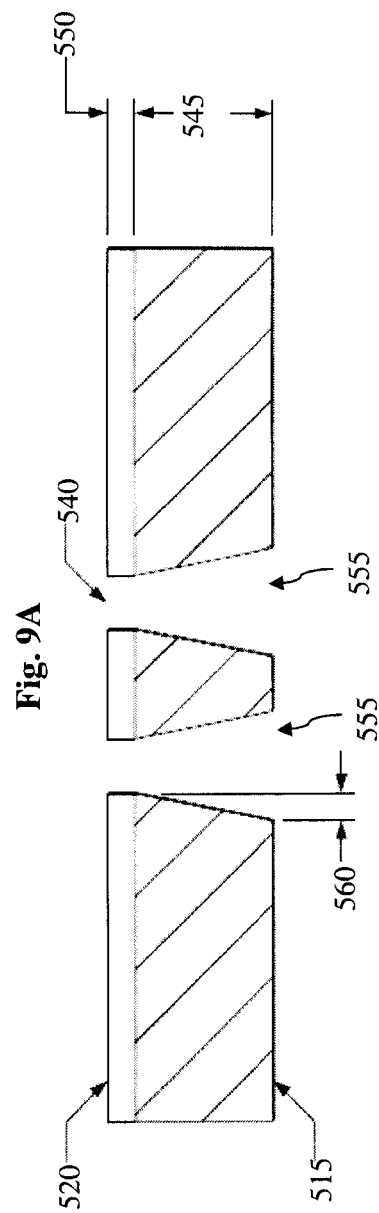
Fig. 9A
Fig. 9B

MINIMIZING HARMFUL EFFECTS CAUSED BY RETICLE DEFECTS BY RE-ARRANGING IC LAYOUT LOCALLY

TECHNICAL FIELD

The present disclosure relates generally to semiconductor device fabrication, and more particularly, to minimizing the harmful effects caused by defects on a photomask.

BACKGROUND

The semiconductor integrated circuit (IC) industry has experienced rapid growth. Technological advances in IC materials and design have produced generations of ICs where each generation has smaller and more complex circuits than the previous generation. However, these advances have increased the complexity of processing and manufacturing ICs and, for these advances to be realized, similar developments in IC processing and manufacturing are needed. In the course of integrated circuit evolution, functional density (i.e., the number of interconnected devices per chip area) has generally increased while geometry size (i.e., the smallest component (or line) that can be created using a fabrication process) has decreased.

As a part of the semiconductor fabrication, patterned photomasks or reticles (the terms photomasks and reticles are used interchangeably hereinafter) are used to pattern semiconductor features onto a wafer. A blank reticle (or a reticle blank) is used to create the patterned reticle. However, some blank reticles may contain defects, such as phase defects of an Extreme Ultraviolet (EUV) lithography mask. Without correction, these defects may cause problems in semiconductor fabrication and lead to device failures and/or low yields. As the geometry sizes for semiconductor features shrink and pattern density increases, it may be increasingly difficult to avoid these reticle defects.

Therefore, while existing methods of forming patterned reticles have been generally adequate for their intended purposes, they have not been entirely satisfactory in every aspect.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIGS. 1A-1B, 2A-2F, 3A-3F, 4A-4C, 5A-5F, and 6A-6C are example top view layouts that help illustrate various methods of locally re-arranging IC layouts to minimize harmful effects caused by reticle defects according to embodiments of the present disclosure.

FIGS. 7A-10A and 7B-10B illustrate diagrammatic perspective and cross-sectional views, respectively, of reticles that may include irreparable defects according to embodiments of the present disclosure.

DETAILED DESCRIPTION

Figure 3D:
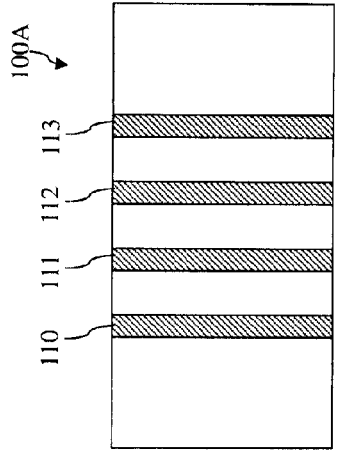

It is to be understood that the following disclosure provides many different embodiments, or examples, for implementing different features of the invention. Specific examples of components and arrangements are described below to simplify the present disclosure. These are, of course, merely examples and are not intended to be limiting. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Various features may be arbitrarily drawn in different scales for the sake of simplicity and clarity.

After a semiconductor device such as an integrated circuit has been designed, layout engineers will generate an IC layout (also referred to as IC layout design or IC layout plan) of the integrated circuit. The IC layout may contain a plurality of different layout layers that each contain a plurality of semiconductor features. These semiconductor features may include critical feature, such as metal lines, vias, capacitors, inductors, transistors, diodes, or other microelectronic components that need to function correctly for the IC to operate in a desired manner. These semiconductor features may also include non-critical features, such as larger dimension features and dummy features, which are not essential for the IC to operate in the desired manner. The IC layout is then patterned onto a blank reticle, so that the patterned reticle can be used in photolithography processes later to transfer the IC layout onto a semiconductor wafer.

However, sometimes the blank reticle contains defects, for example a phase defect for an Extreme Ultraviolet (EUV) lithography mask. Information regarding the defects, such as the locations of the defects and the types of the defects, may be supplied by a vendor of the blank reticle or may be extracted by engineers of a semiconductor fab by appropriate analysis. Knowing the locations of the defects on the reticle, the engineers of the semiconductor fab may be able to determine whether the defects will cause interference with the IC layout if the IC layout is eventually patterned onto the blank reticle.

In more detail, if only the non-critical features land on the defects of the reticle, it will not adversely impact the desired operation of the IC, and thus the presence of the defects on the blank reticle is not an issue. However, if one of the critical features land on the defects, it will adversely impact the desired operation of the IC. When this happens, the IC layout may be globally manipulated before being patterned onto the blank reticle. As examples, the global manipulation of the IC layout may include shifting the entire IC layout in an X direction or a Y direction (or combinations thereof), or rotating the entire IC layout by an angle in a range from 0 degree to 360 degrees. It may be determined that, by globally shifting or rotating the IC layout in a precise manner, the landing of the critical features on the defects of the reticle may still be avoided. In that case, the presence of the defects on the blank reticle may not be an issue either.

Unfortunately, there are times where the landing of the critical features on the defects cannot merely be prevented by a global manipulation of the IC layout. That is, regardless of how the entire IC layout is globally shifted or rotated, at least some of the critical features will still land on one or more defects of the blank reticle. This is more prone to occur when there are numerous defects on the blank reticle and/or when the semiconductor feature pattern density of the IC layout is high. In other words, the aforementioned global manipulation of the IC layout may avoid the landing of certain critical features on some of the target defects, but in doing so, other critical features may now land on these defects (or other defects) of the reticle. In these cases, the blank reticle may need to be repaired, or even discarded when it is irreparable, thereby leading to waste and higher costs.

To overcome these issues discussed above, the present disclosure offers a solution that involves a local re-arrangement of the IC layout in response to the defect information of a blank reticle. The locally re-arranged IC layout may be patterned onto the blank reticle without causing any of the critical features of the IC layout to land on any of the defects, as discussed in further detail below.

FIGS. 1A and 1B illustrate an example embodiment of the local re-arrangement of the IC layout according to various aspects of the present disclosure. In more detail, FIG. 1A is a simplified diagrammatic top view illustration of a portion of an original IC layout 30A (i.e., before the local re-arrangement) according to an embodiment, and FIG. 1B is a simplified diagrammatic top view illustration of a portion of the IC layout 30B after it has been locally re-arranged according to an embodiment. The portion of the IC layout 30A contains four IC blocks A, B, C, and D. Each of the layout blocks A, B, C, and D may include one or more critical and/or non-critical semiconductor features, which are not illustrated herein for the sake of simplicity. An irreparable defect 40 of the reticle is projected to overlap with the layout block B and cause interference thereto. Hence, the defect 40 must be addressed.

One way of reducing the harmful effects caused by reticle defects is by a local re-arrangement of layout blocks that are functionally equivalent. In this example, layout blocks B and C are functionally equivalent blocks. Functionally equivalent blocks may contain different layouts but provide the same function. To provide more clarity regarding functional equivalence, FIGS. 2A-2F illustrate some simplified example embodiments of functionally equivalent blocks. Specifically, FIG. 2A illustrates an embodiment of an interconnect element 50A, for example a metal line. FIG. 2B illustrates a defect 60 and an embodiment of a detoured version of the interconnect element 50A of FIG. 2A, which is labeled as 50B in FIG. 2B. The detoured interconnect element 50A goes around (or bypasses) the defect 60 and therefore does not land on (or intersect with) the defect 60. Similarly, FIG. 2C illustrates the defect 60 and an embodiment of a detoured interconnect element 50C that bypasses the defect 60, although in an opposite direction than the detoured interconnect element 50B.

The layout blocks corresponding to FIGS. 2A, 2B, and 2C are considered to be functionally equivalent, since the main functional element—the interconnect element 50A/50B/50C—accomplish the same function (i.e., electrical routing) in each case. The fact that the detoured versions of the interconnect elements 50B and 50C have modified geometry or shape than the original interconnect element 50A is inconsequential, since the modified geometry or shape does not substantially affect the electrical or functional characteristics of the original interconnect element 50A. It is understood that the modified shape or geometry associated with the interconnect elements 50B and 50C illustrated in FIGS. 2B-2C is merely an example embodiment and is not intended to be limiting. The amount of detour manifested by the modified interconnect elements 50B/50C may vary from embodiment to embodiment. For example—the interconnect elements 50B/50C may be "bent" further away, or close to, the defect 60 than that is shown in FIGS. 2B/2C. As another example, the interconnect elements 50C/50C may have a zig-zagged shape to approximate a curvature.

The layout blocks in FIGS. 2A-2C are located in the same interconnect layer in the illustrated embodiment. However, layout blocks need not even be in the same layer to be considered functionally equivalent. For example, FIG. 2D illustrates embodiments of interconnect elements 70, 71, 72, and 73. In FIG. 2E, an embodiment of one of the interconnect elements 71 is broken up into two segments 71A and 71B to avoid being landed on a defect 65 of a blank reticle. The segments 71A and 71B are coupled to vias 80 and 81, respectively. In FIG. 2F, an embodiment of an interconnect element 90—which is located in a different interconnect layer than the interconnect elements 70-73—is located above or below the location of the defect 65. The interconnect element 90 is also electrically coupled to the vias 80 and 81 and as such electrically interconnects the segments 71A and 71B together. Thus, the layout block corresponding to FIG. 2D is considered to be functionally equivalent to the layout blocks corresponding to FIGS. 2E and 2F collectively. In that regard, the defect 65 is bypassed in a vertical dimension (i.e., in a different interconnect layer through an additional interconnect element), rather than in a horizontal dimension.

Again, this vertical detour shown in FIGS. 2E-2F is also merely an example. In other embodiments, the additional interconnect element 90 that bridges the segments 71A and 71B together need not be located directly over (or under) the defect 65, nor does the interconnect element 90 have to be located in an interconnect layer immediately above or immediately below (i.e., by one level) the interconnect layer in which the interconnect elements 70-73 are located.

As discussed above with reference back to FIG. 1A, the portion of the IC layout 30A is projected to land on the defect 40 of a blank reticle if the IC layout 30A is patterned onto the blank reticle. Specifically, the defect 40 will intersect or overlap with the layout block B. As discussed above, the layout blocks B and C are functionally equivalent. Therefore, according to the various aspects of the present disclosure, the layout blocks B and C may be swapped, which results in the re-arranged layout 30B as shown in FIG. 1B. The swapping of the locations of the layout blocks B and C does not affect the functionalities of either the layout blocks B or C. Hence, the desired operation of the IC would not be affected either. It may be determined that the landing of the layout block C on the defect 40 will not cause any interference to any of the critical features of the layout block C. For example, the defect 40 may be intersecting or overlapping with a dummy feature or a dark feature, which does not alter the intended functionalities of the circuitry in layout block C. In this manner, a local re-arrangement (i.e., swapping the layout blocks B and C) of the IC layout effectively prevents the defect 40 from causing problems to the overall IC layout. In some embodiments, before the re-arranged IC layout 30B is patterned onto the blank reticle, it may also need to be rotated or shifted after the layout blocks B and C are swapped. Regardless, the locational swapping of the functionally equivalent blocks B and C offers an additional degree of freedom with respect to the IC layout design and the modification thereof.

Figure 3E:
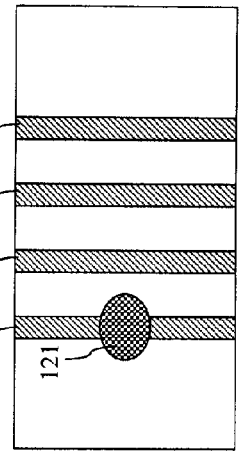
Figure 3F:
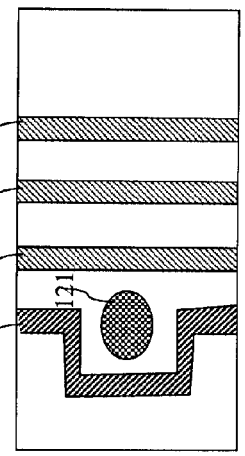
Figure 3A:
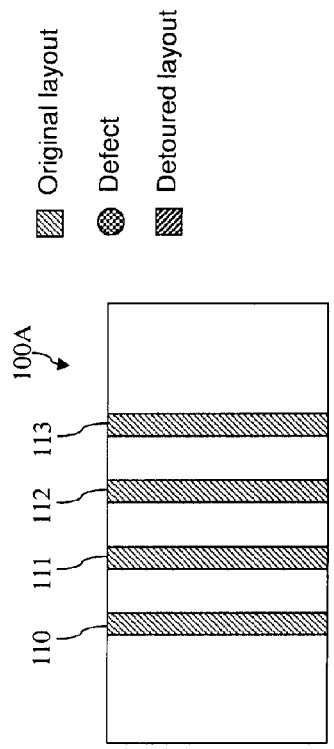
Figure 3B:
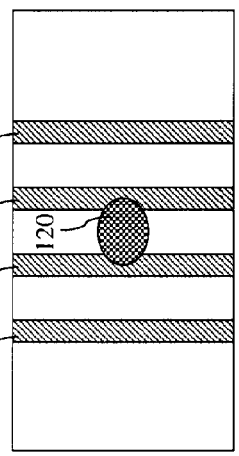
Figure 3C:
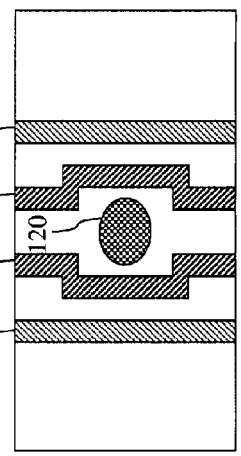

FIGS. 3A-3F illustrate additional example embodiments of the local re-arrangement of the IC layout according to various aspects of the present disclosure. In more detail, FIG. 3A is a simplified diagrammatic top view illustration of a portion of an original IC layout 100A (i.e., before the local re-arrangement) according to an embodiment. The original IC layout 100A contains four interconnect elements 110, 111, 112, and 113. However, as shown in FIG. 3B, if the original IC layout 100A is patterned onto a blank reticle, two of the interconnect elements 111-112 are projected to land on a defect 120 of the blank reticle. In other words, the defect 120 would be located near a middle or center portion of the layout 100A. To avoid this, the original layout 100A may be locally re-arranged into the layout 100B shown in FIG. 3C by modifying the shape of the interconnect elements 111-112 to create detoured interconnect elements 111A-112A. The detoured interconnect elements 111A-112A now go around (or bypass) the defect 120, instead of landing on the defect 120.

FIG. 3D illustrates the same embodiment of the original IC layout 100A. However, it is projected that the interconnect element 110 will land on a defect 121, as shown in FIG. 3E. In other words, the defect 121 would be located near an edge portion of the layout 100A. To avoid this, the original layout 100A may be locally re-arranged into the layout 100C shown in FIG. 3F by modifying the shape of the interconnect element 110 to create a detoured interconnect elements 110A. The detoured interconnect element 110A now goes around (or bypasses) the defect 121, instead of landing on the defect 121.

Based on the above discussions with reference to FIGS. 3A-3F, it can be seen that the location of the defect on the reticle can make the detour (or the local re-arrangement) of the layout easier or more difficult. If the defect impacts only a critical feature that is located near an edge portion of a layout, such as the case shown in FIG. 3E, the amount of modification to the IC layout may be minimal. However, if the defect is located near a middle portion of a layout, such that a plurality of densely populated critical features are disposed nearby, as in the case shown in FIG. 3B, it may make the modification to the IC layout more difficult. Sometimes, this may even necessitate additional modification to the IC layout to satisfy design rules, as discussed below with reference to FIGS. 4A-4C.

FIG. 4A is a simplified diagrammatic top view illustration of a portion of an original IC layout 150A (i.e., before the local re-arrangement) according to an embodiment. The original IC layout 150A contains a plurality of interconnect elements, including interconnect elements 160, 161, 162, 163, 164, and 165. As shown in FIG. 4B, if the original IC layout 150A is patterned onto a blank reticle, two of the interconnect elements 161-162 are projected to land on a defect 170 of the blank reticle. To avoid this, the original layout 150A may be locally re-arranged in a manner similar to that shown in FIG. 3C. In other words, the interconnect elements 161 and 162 may be detoured outwards to bypass the defect 170. However, design rules governing the IC layout may stipulate minimal spacing and/or pitch requirements for semiconductor features. For example, the design rules may stipulate that a spacing 180 between adjacent interconnect elements, such as interconnect elements 160 and 161, must be greater than or equal to a distance X. The design rules may also stipulate that a pitch 185 among the interconnect elements must be greater than or equal to a distance Y. However, the detouring of the interconnect elements 161-162 may cause the spacing 180 or the pitch 185 to be less than their specified minimums X and Y, respectively. In other words, the detouring of the interconnect elements 161-162 may cause the design rules to be violated, which is unacceptable.

In order to avoid the defect 170 and to satisfy the design rules simultaneously, the original IC layout 150A in FIG. 4A may be locally re-arranged into a modified IC layout 150B as shown in FIG. 4C according to an embodiment. As is shown, not only are the interconnect elements 161-162 modified into detoured interconnect elements 161A and 162A, the interconnect elements 160 and 163 are also modified into detoured elements 160A and 163A, even though they would not have landed on the defect 170. The modification of the interconnect elements 160 and 163 is done so that the minimum spacing and pitch requirements are still met by the detoured interconnect elements 160A-163A.

To illustrate using simple numbers, suppose the portion of the interconnect element 161 adjacent to the defect 170 needs to be moved to the left (i.e., toward the interconnect element 160) by 10 units of length to avoid landing on the defect 170. Also suppose that the original spacing 180 between the interconnect elements 160-161 may only be shrunk by 5 units of length before the minimum spacing requirement X is reached. In other words, the design rules allow the interconnect element 161 to be moved toward the interconnect element 160 by only 5 units of length, but the avoidance of the defect 170 requires the interconnect element 161 to be moved toward the interconnect element 160 by 10 units of length, which would then violate the spacing requirements set forth by the design rules.

As an example solution, the present disclosure also modifies the shape and geometry of the interconnect element 160, so that a portion of the modified interconnect element 160 is also moved to the left (away from the interconnect element 161). Using the numbers above, if the interconnect element 160A is moved to the left by 5 units of length, then a spacing 180A between the modified interconnect elements 160A-161A is still greater than or equal to the minimum spacing requirement X, thus satisfying the design rules. Meanwhile, the interconnect element 161A is moved sufficiently to the left such that it will no longer land on the defect 170. In other words, the modification of the interconnect element 160 helps absorb the total amount of movement necessitated by the modification of the interconnect element 161. In fact, this absorption may be propagated to the interconnect elements to the left of the interconnect element 160A. That is, each of the interconnect elements to the left of the interconnect element 160A may be modified to help absorb a portion of the total spacing impact caused by the modification of the interconnect element 161A. For reasons of simplicity, however, FIG. 4C only illustrates the modified interconnect elements 160A-163A. In a similar manner, the interconnect element 163 is also modified to be moved to the right, so as to create more space for the interconnect element 162 to move to the right as well.

In addition to (or instead of) modifying the interconnect elements adjacent to the ones that land on the defect, the present disclosure also allows for the total movement of the interconnect features into a secured space. For example, an empty space 200 (devoid of critical features) exists between interconnect elements 164 and 165. This empty space 200 is relatively expansive and exceeds the minimum spacing X required between adjacent semiconductor features by a great deal, for example by multiple times. As such, the empty space 200 may be referred to as a secured space 200. Referring to FIG. 4C, the interconnect elements (including the interconnect elements 164, 160, and 161) to the right of the interconnect element 165 may be moved to the left (i.e., toward the interconnect element 165A) such that a distance 210 between the interconnect elements 164 and 165 is decreased to a distance 210A. The decreased distance 210A also creates more "room" for the interconnect elements 160A and 161A to move away from the defect 170 without violating the spacing requirements stipulated by the design rules.

The existence of vias (or contacts) may also change the detour of an interconnect element. Referring to FIG. 5A, a portion of an IC layout 230A includes interconnect elements (e.g., metal lines in a metal layer) 240 and 241 according to an embodiment. The interconnect elements 240-241 are projected to both land on a defect 250 of a reticle if the IC layout 230A is patterned onto the reticle. A via 260 is also interconnected to the interconnect element 240. Had the via 260 not been there, the detour of the interconnect elements 240-241 may be accomplished in a manner similar to that shown in FIGS. 3B-3C. In other words, both of the interconnect elements 240-241 can be made to go around or bypass the defect 250. However, the existence of the via 260 (and the fact that it is supposed to be interconnected with the interconnect element 240 may lead to a modification of the detour.

According to various embodiments of the present disclosure, the IC layout 230A is shifted to the left before being patterned onto the reticle, such that the defect 250 would no longer intersect with the interconnect line 240 (i.e., the interconnect line coupled to the via 260). This results in the modified IC layout 230B shown in FIG. 5B. Of course, the defect 250 may still be overlapping with the interconnect element 241 in the IC layout 230B. Therefore, the IC layout 230B may be further re-arranged by detouring the interconnect element 241A to go around the defect 250. This results in the re-arranged IC layout 230C, as shown in FIG. 5C according to an embodiment.

In a similar manner, an IC layout 230D (shown in FIG. 5A) may be shifted to result in the IC layout 230E (shown in FIG. 5B) so as to avoid having the interconnect element 241 (to which a via 261 is interconnected) land on the reticle defect 250. The IC layout 230E is then locally re-arranged to result in the IC layout 230F (shown in FIG. 5F) by having a detoured interconnect element 240A go around the defect 250.

Figure 6C:
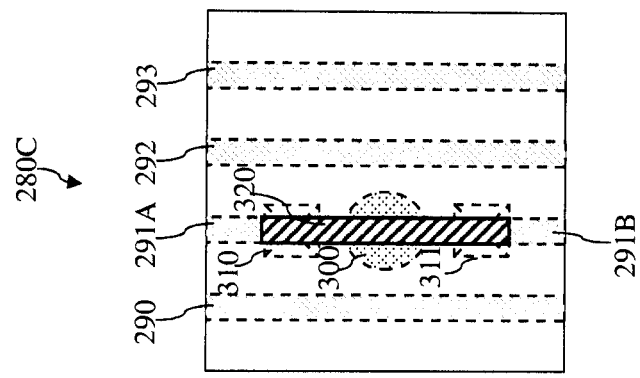
Figure 6B:
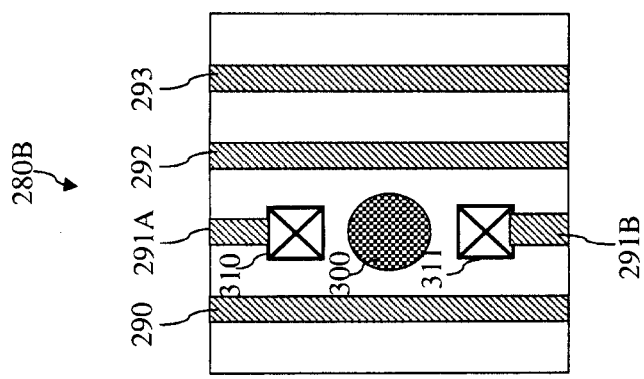
Figure 6A:
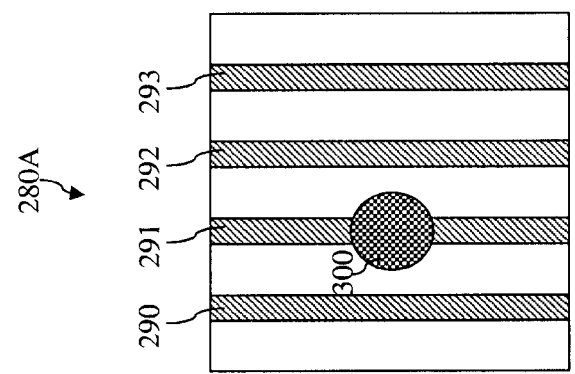

FIGS. 6A-6C illustrate an embodiment of the present disclosure in which the local re-arrangement of an IC layout involves multiple interconnect layers. Referring to FIG. 6A, an original IC layout 280A contains interconnect elements 290-293. One of the interconnect elements 291 is projected to land on a defect 300 of a blank reticle if the IC layout 280A is to be patterned onto the blank reticle. According to the various aspects of the present disclosure, the IC layout 280A is locally re-arranged into IC layouts 280B (shown in FIG. 6B) and 280C (shown in FIG. 6C), which correspond to separate interconnect layers. For example, the IC layout 280C may be disposed one or more interconnect layers above or below the IC layout 280B. As shown in the IC layout 280B, the interconnect element 291 is divided into two segments 291A and 291B, which are now separated by a gap in which the defect 300 is located. Vias 310 and 311 are generated in the IC layout 280B to be electrically coupled to the segments 291A and 291B, respectively. As shown in the IC layout 280C, an additional interconnect element 320 is generated, whose distal ends are electrically coupled to the vias 310 and 311, respectively. As such, the interconnect element 329 electrically couples together the segments 291A-291B. Therefore, the functionality of the interconnect element 291 in the original IC layout 280A is preserved, while the defect 300 is also bypassed through the locally re-arranged IC layouts 280B-280C.

Figure 7A:
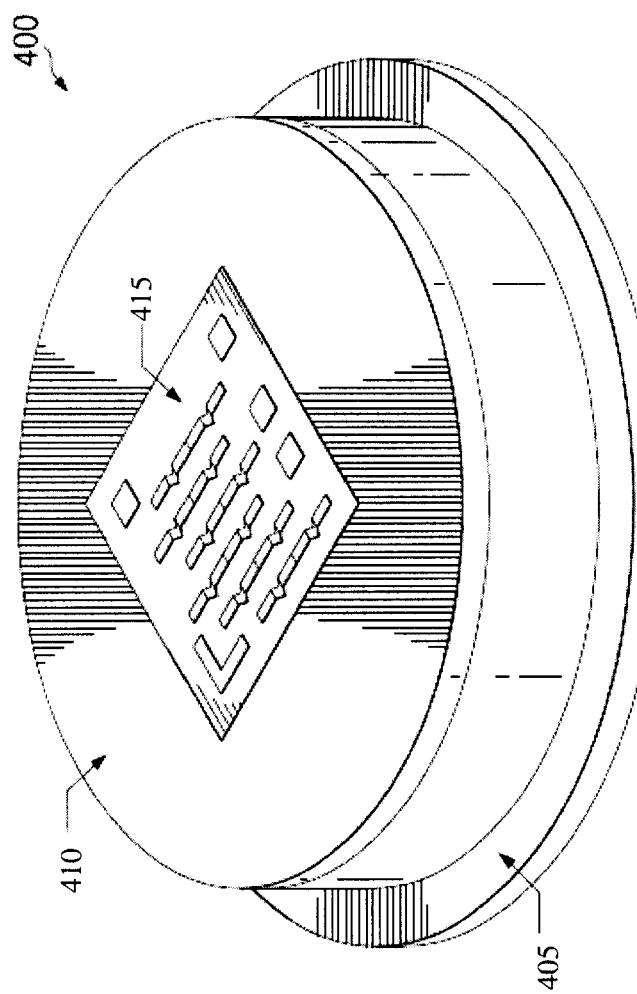
Figure 7B:
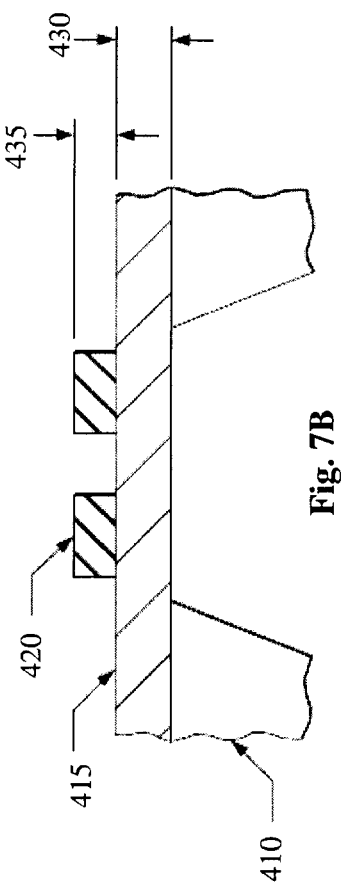

FIGS. 7A-10A are simplified diagrammatic perspective views, and FIGS. 7B-10B are simplified cross-sectional views, of various types of systems including reticles (also referred to as masks) that may contain hard-to-repair defects according to various embodiments. In other words, these types of reticles shown in FIGS. 7A-10A and 7B-10B may be suitable candidate reticles for being patterned with locally re-arranged IC layouts discussed above according to various aspects of the present disclosure. For example, FIGS. 7A-7B illustrate an X-ray mask 400, which includes a ring support 405, a silicon wafer 410 disposed over the ring support 405, a SiC membrane 415 disposed over the silicon wafer 410, and a TaX absorber layer 420 disposed over the SiC membrane 415. The SiC membrane 415 has a thickness 430. In some embodiments, the thickness 430 is in a range from about 1 micron to about 4 microns. The TaX absorber layer 420 has a thickness 435. In some embodiments, the thickness 435 is in a range from about 300 nm to about 900 nm.

Figure 8A:
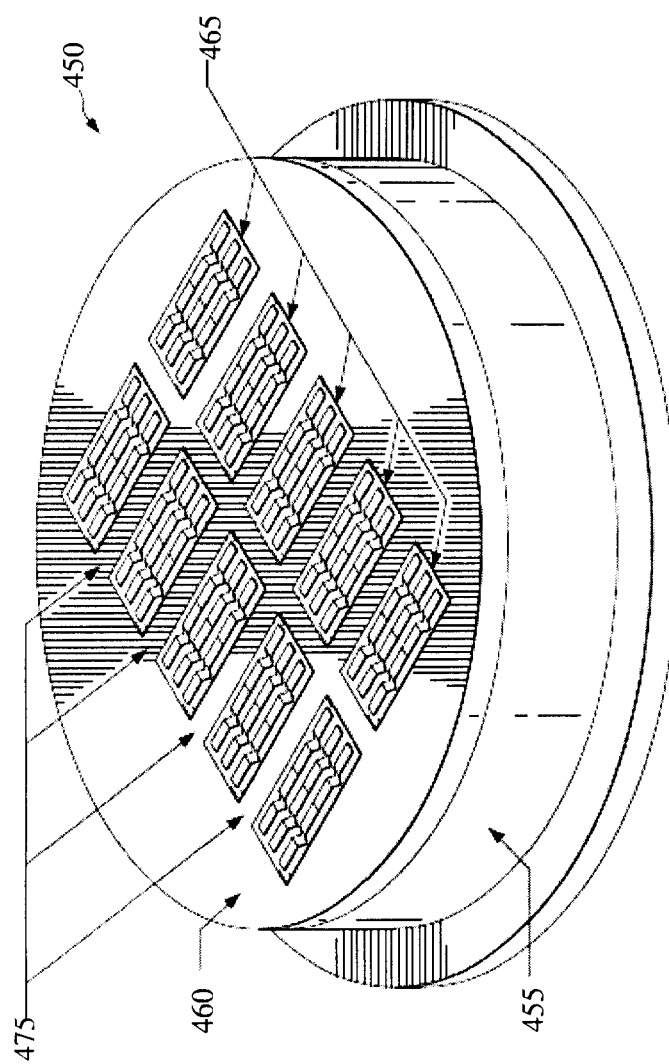
Figure 8B:
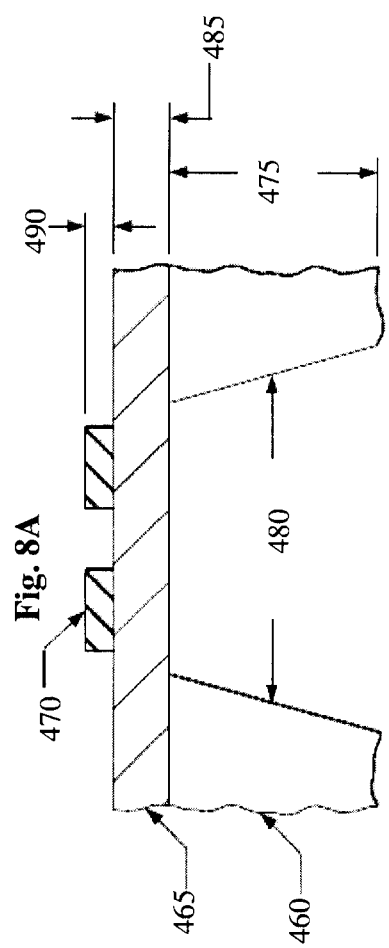

FIGS. 8A-8B illustrate a scalpel mask system 450, which includes a support ring 455, a silicon wafer 460 disposed over the support ring 455, a $SiN_x$ membrane 465 disposed over the silicon wafer 460, and a W/Cr (scatterer) layer 470 disposed over the $SiN_x$ membrane 465. The silicon wafer 460 is etched to form a strut 475 and a membrane width 480. In some embodiments, the strut 475 is in a range from about 0.5 mm to about 2 mm, and the membrane width 480 is in a range from about 0.5 mm to about 2 mm. The $SiN_x$ membrane 465 also has a thickness 485. In some embodiments, the thickness 485 is in a range from about 50 nm to about 200 nm. The W/Cr (scatterer) layer 470 has a thickness 490. In some embodiments, the thickness 490 is in a range from about 30 nm to about 120 nm.

FIGS. 9A-9B illustrate an ion beam mask system 500, which includes a support ring 505, a silicon wafer 510 disposed over the support ring 505, a silicon membrane 515 disposed on the silicon wafer 510, and a carbon layer 520 disposed over the Si membrane 515. The silicon wafer 510 may include a stress relief pattern 525. A complimentary field A 530 and a complimentary field B 535 are disposed on the Si membrane 515. The complimentary field A 530 and the complimentary field B 535 may include one or more stencil pattern openings, for example a stencil pattern opening 540. The Si membrane 515 has a thickness 545. In some embodiments, the thickness 545 is in a range from about 1 micron to about 6 microns. The carbon layer 520 has a thickness 550. In some embodiments, the thickness 550 is in a range from about 200 nm to about 1000 nm. The Si membrane 515 also includes openings 555. Each opening 555 may have a retrograde angle 560. In some embodiments, the retrograde angle 560 is in a range from about 0.5 degrees to about 5 degrees.

Figure 10A:
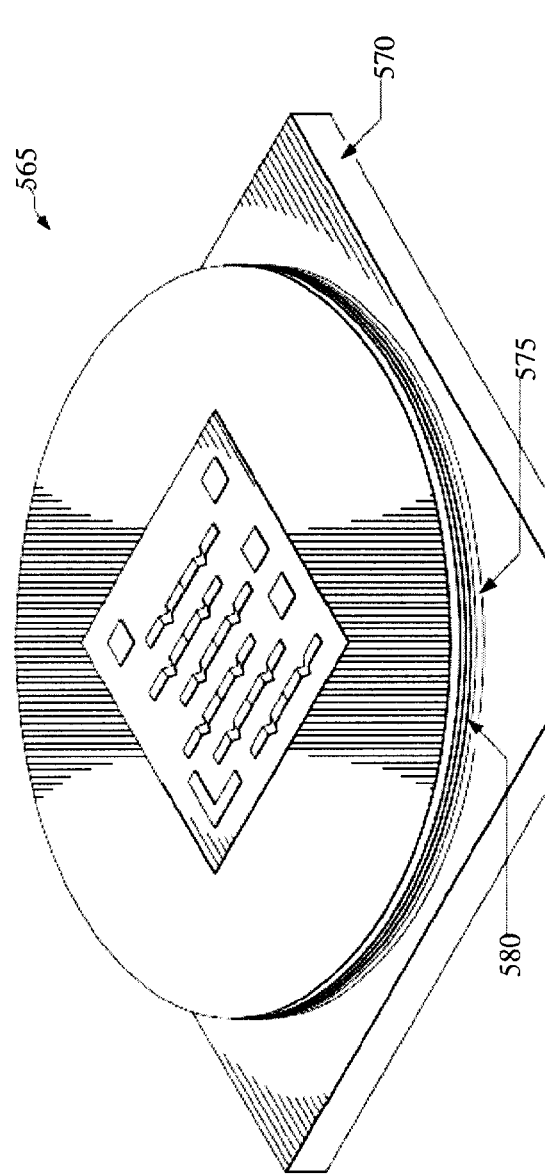
Figure 10B:
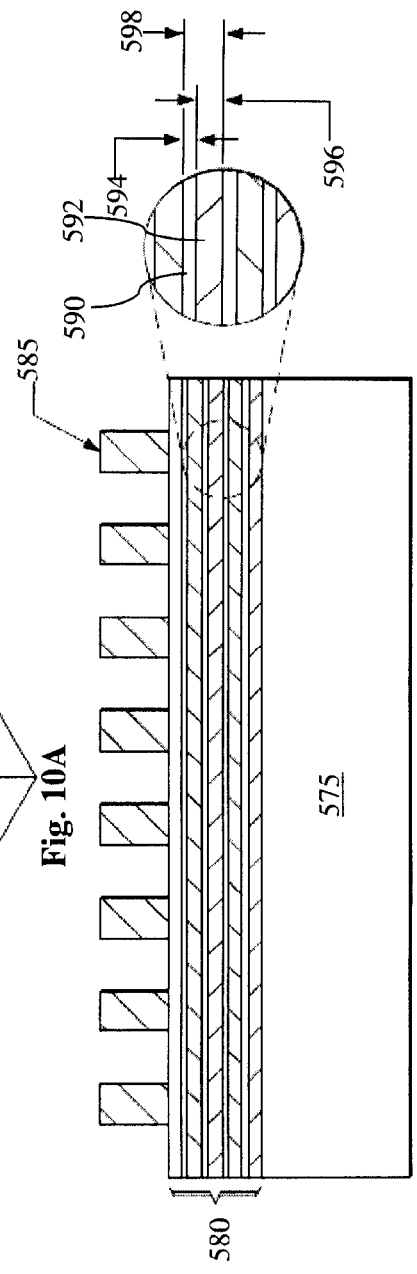

FIGS. 10A-10B illustrate an EUV mask system 565, which includes a support base 570, a silicon wafer substrate 575 disposed over the support base 570, a multi-layer reflective stack 580 disposed over the silicon wafer substrate 575, and a patterned absorber layer 585 disposed over the multi-layer reflective stack 580. The patterned absorber layer 585 may include germanium or aluminum. The multi-layer reflective stack 580 may include a plurality of pairs of molybdenum and silicon, or pairs of molybdenum and beryllium. In some embodiments, the number of pairs may be in a range from about 20 pairs to about 60 pairs. In the illustrated embodiment, the multi-layer reflective stack 580 includes alternating pairs of silicon layers 590 and molybdenum layers 592. Each silicon layer 590 has a thickness 594. In some embodiments, the thickness 594 is in a range from about 1.5 nm to about 4 nm. Each molybdenum layer 592 has a thickness 596. In some embodiments, the thickness 595 is in a range from about 2 nm to about 8 nm. A combined thickness 598 of the pair of the silicon layer 590 and the molybdenum layer 592 is in a range from about 4 nm to about 14 nm.

Figure 11:
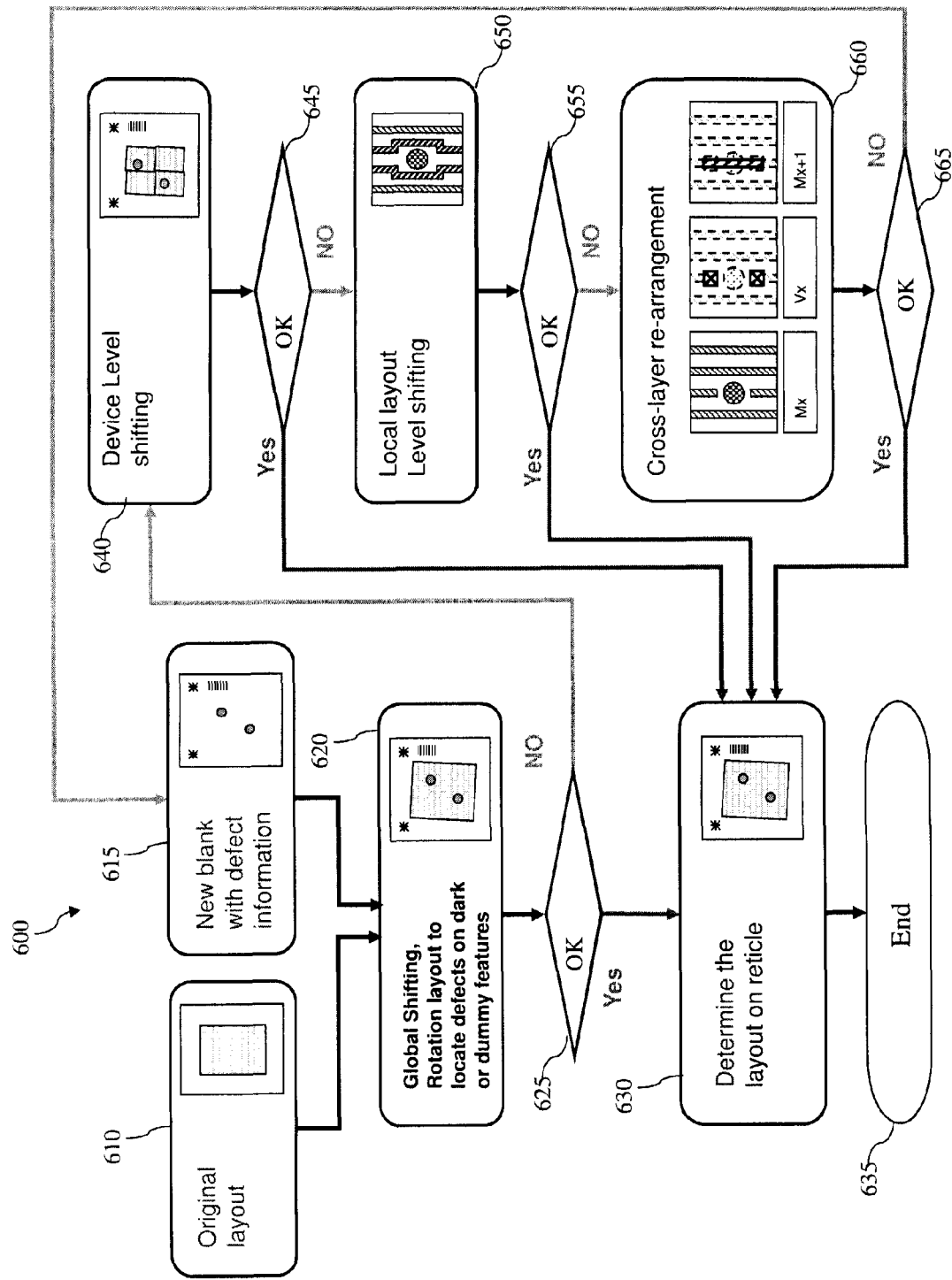
FIGS. 11-12 illustrate simplified flowcharts directed towards methods of locally re-arranging IC layouts to minimize harmful effects caused by reticle defects according to embodiments of the present disclosure.

FIG. 11 is a simplified diagrammatic flowchart illustrating a method 600 of the present disclosure discussed above. In step 610, an original IC layout is obtained or received. In step 615, the defect information of a new blank reticle is received. The defect information may include, among other things, locations of one or more irreparable defects on the reticle. In step 620, a global manipulation (e.g., shifting or rotating) of the original IC layout is performed in an attempt to locate (or reposition) the defects of the reticle on dummy features, dark features, or otherwise non-critical features of the IC layout. If the step 620 is determined to be successful (i.e., the reticle defects are repositioned on non-critical defects of the IC layout) in a decision step 625, a step 630 is performed to determine the IC layout on the reticle. In other words, the globally manipulated IC layout is ready to be patterned onto the reticle.

If the step 620 is determined to be unsuccessful (or insufficient), then a device level shifting is performed in step 640. In other words, functionally equivalent blocks are swapped so as to avoid having critical semiconductor features of the IC layout land on the defects. If the step 640 is determined to be successful in a decision step 645, then the re-arranged IC layout is ready to be patterned onto the reticle in step 630. Otherwise, a local layout level shifting is performed in step 650, for example by detouring one or more interconnect elements to go around or bypass the defects.

If the step 650 is determined to be successful in a decision step 655, then the re-arranged IC layout is ready to be patterned onto the reticle in step 630. Otherwise, a cross-layer re-arrangement is performed in step 660, for example by breaking up an interconnect element to avoid landing on a defect and interconnecting the broken up interconnect element with an additional interconnect element in a different interconnect layer. If the step 660 is determined to be successful in a decision step 665, then the re-arranged IC layout is ready to be patterned onto the reticle in step 630. Otherwise, the method 600 repeats at step 615 again.

Figure 12:
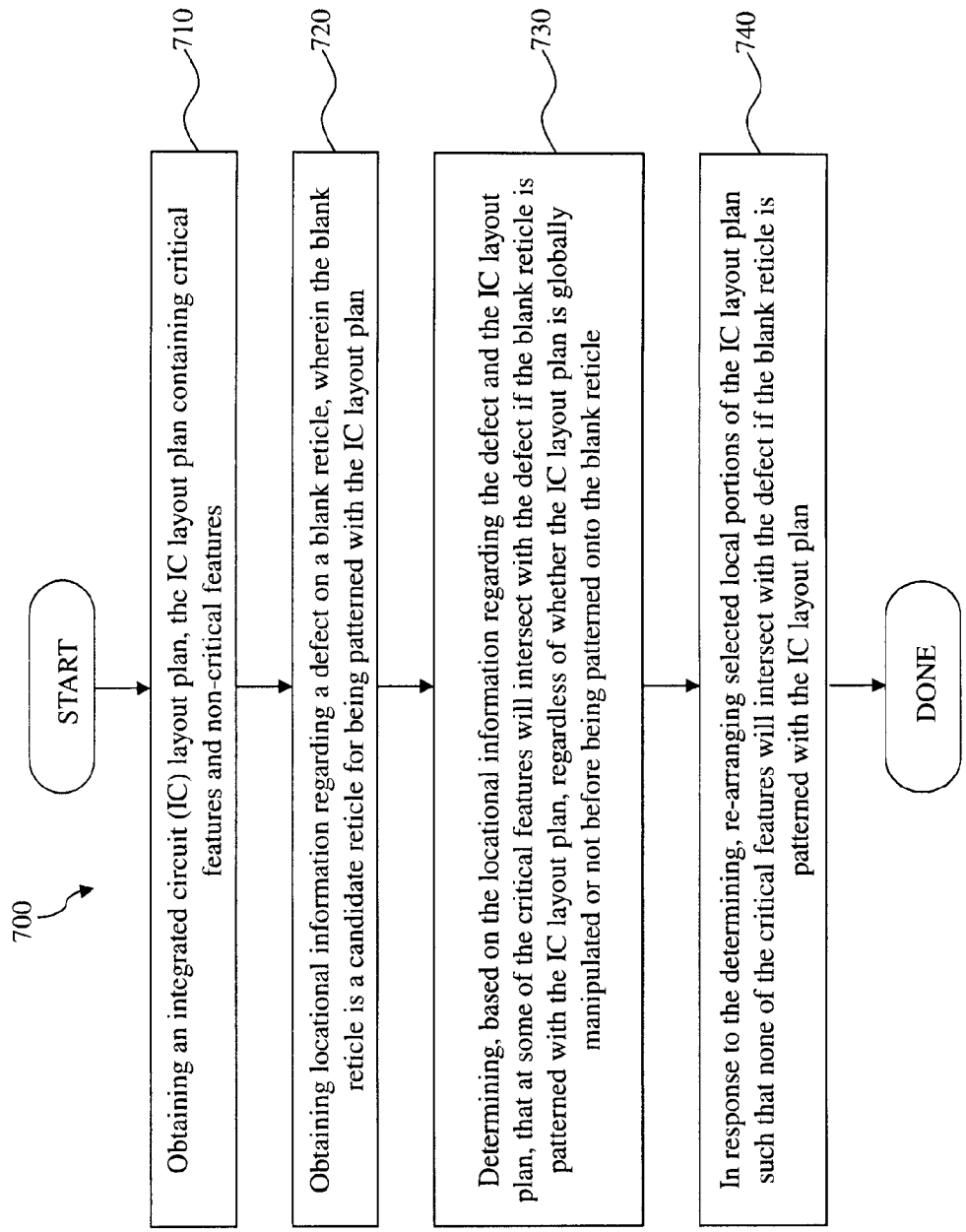

FIG. 12 is a simplified flowchart illustrating a method 700 of locally re-arranging an IC layout according to various aspects of the present disclosure. The method 700 includes a step 710 of obtaining an integrated circuit (IC) layout plan. The IC layout plan contains critical features and non-critical features.

The method 700 includes a step 720 of obtaining locational information regarding a defect on a blank reticle. The blank reticle is a candidate reticle for being patterned with the IC layout plan, for example the various reticles discussed above with reference to FIGS. 7-10.

The method 700 includes a step 730 of determining, based on the locational information regarding the defect and the IC layout plan, that at some of the critical features will intersect with the defect if the blank reticle is patterned with the IC layout plan, regardless of whether the IC layout plan is globally manipulated or not before being patterned onto the blank reticle. In some embodiments, the determining step 730 includes determining that at least some of the critical features of the first layout block will intersect with the defect but none of the critical features of the second layout block will intersect with the defect if respective locations of the first and second layout blocks are swapped.

The method 700 includes a step 740 of re-arranging selected local portions of the IC layout plan such that none of the critical features will intersect with the defect if the blank reticle is patterned with the IC layout plan. The step 740 is performed in response to the determining step 730 discussed above. In some embodiments, the selected local portions of the IC layout plan contains a first layout block and a second layout block that is a functional equivalent of the first layout block. In some embodiments, the re-arranging of the IC layout plan comprises swapping the locations of the first and second layout blocks.

In some embodiments, the critical features include a first metal line that would intersect with the defect if the blank reticle is patterned with the IC layout plan. The re-arranging of the IC layout plan in step 740 includes modifying a shape of the first metal line such that the first metal line bypasses the defect when the re-arranged IC layout plan is patterned onto the blank reticle. In some embodiments, the re-arranging of the IC layout plan in step 740 further includes modifying a shape of a second metal line disposed adjacent to the first metal line such that a spacing between the modified first and second metal lines satisfies design rules governing the IC layout plan.

In some embodiments, the critical features include a first metal line that would intersect with the defect if the blank reticle is patterned with the IC layout plan. The re-arranging of the IC layout plan in step 740 includes dividing the first metal line into a first segment and a second segment, and electrically interconnecting the first and second segments with a second metal line, wherein the first metal line and the second metal line are located in different metal layers.

It is understood that additional steps may be performed before, during, or after the steps 710-740. For example, the method 700 may further include a step of fabricating a photomask at least in part by patterning the re-arranged IC layout plan or a globally manipulated re-arranged IC layout plan onto the blank reticle.

Figure 13:
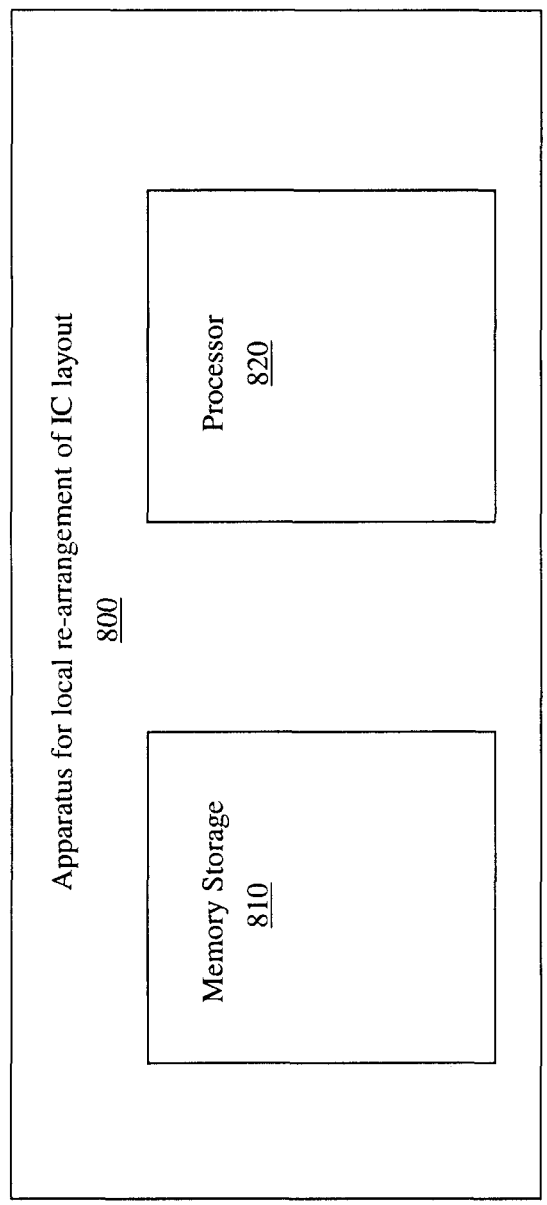
FIG. 13 is a simplified diagrammatic view of a machine that can be used to perform the local re-arrangement of IC layouts according to embodiments of the present disclosure.

FIG. 13 is a simplified diagrammatic view of an apparatus 800 for performing the various local re-arrangement of the IC layout as discussed above with reference to FIGS. 1-12. In one embodiment, the apparatus 800 is a machine that includes a non-transitory computer-readable medium, for example a memory storage component 810, that stores executable programming instructions. The apparatus 800 may also include a processor component 820 that executes the executable programming instructions stored in the memory storage component 810. The executed instructions allow the processor component 820 to re-arrange the IC layout locally, for example according to the methods 600 and 700 discussed above. The re-arranged IC layout may then be patterned onto a blank reticle containing defects. The re-arranged IC layout may also undergo another global shifting or rotating process before being patterned onto a blank reticle that contains the defects.

For semiconductor device products that are fabricated using the local IC layout re-arrangement methods discussed above, there may not necessarily be any noticeable differences from IC chip to IC chip. For example, if the reticle used to fabricate the IC chip does not have any irreparable defects, or contains defects that can be repaired or otherwise eliminated by a global manipulation of an IC layout, then the end products (i.e., the IC chips) may look the same. In addition, if the IC chips being examined come from the same wafer or lot that used the reticle that was patterned with a locally re-arranged IC layout, the IC chips may also appear the same. However, if minor layout differences are observed (such as detoured metal lines or swapped equivalent functional blocks) for two or more IC chips that are supposed to be the same device, then that is a possible indication that these IC chips were fabricated using various aspects of the present disclosure discussed above.

One aspect of the present disclosure involves a method. The method includes: receiving an integrated circuit (IC) layout, the IC layout containing critical features and non-critical features; receiving defect information of a blank reticle with respect to a defect of the blank reticle; determining, based on the defect information and the IC layout, that the defect will cause interference with at least some of the critical features if the blank reticle is patterned with the IC layout; and in response to the determining, re-arranging the IC layout in a localized manner such that the defect will no longer cause interference with the critical features of the re-arranged IC layout.

Another aspect of the present disclosure involves a method. The method includes: obtaining an integrated circuit (IC) layout plan, the IC layout plan containing critical features and non-critical features; obtaining locational information regarding a defect on a blank reticle, wherein the blank reticle is a candidate reticle for being patterned with the IC layout plan; determining, based on the locational information regarding the defect and the IC layout plan, that at some of the critical features will intersect with the defect if the blank reticle is patterned with the IC layout plan, regardless of whether the IC layout plan is globally manipulated or not before being patterned onto the blank reticle; and in response to the determining, re-arranging selected local portions of the IC layout plan such that none of the critical features will intersect with the defect if the blank reticle is patterned with the IC layout plan.

Yet another aspect of the present disclosure involves a non-transitory computer readable medium. The non-transitory computer readable medium comprises executable instructions that when executed by a processor, causes the processor to perform the steps of: obtaining an integrated circuit (IC) layout plan, the IC layout plan containing critical features and non-critical features; obtaining locational information regarding a defect on a blank reticle, wherein the blank reticle is a candidate reticle for being patterned with the IC layout plan; determining, based on the locational information regarding the defect and the IC layout plan, that at some of the critical features will intersect with the defect if the blank reticle is patterned with the IC layout plan, regardless of whether the IC layout plan is globally manipulated or not before being patterned onto the blank reticle; and in response to the determining, re-arranging selected local portions of the IC layout plan such that none of the critical features will intersect with the defect if the blank reticle is patterned with the IC layout plan.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method, comprising:
    receiving an integrated circuit (IC) layout, the IC layout containing first features and second features different from the first features;
    receiving defect information of a blank reticle with respect to a defect of the blank reticle; determining, based on the defect information and the IC layout, that the defect will cause interference with at least some of the first features if the blank reticle is patterned with the IC layout; and
    in response to the determining, re-arranging, by one or more electronic processors, the IC layout in a localized manner such that the defect will no longer cause interference with the first features of the re-arranged IC layout;
    wherein:
    the IC layout contains a first layout block and a second layout block that is a functional equivalent of the first layout block, the first layout block and the second layout block each containing the first features;
    the determining comprises determining that the defect will cause interference with at least some of the first features of the first layout block but will not cause any interference with any of the first features of the second layout block if the first and second layout blocks are swapped;
    the re-arranging of the IC layout comprises swapping the first and second layout blocks; and
    the re-arranging the IC layout is implemented in fabricating photomasks or the re-arranging the IC layout is provided to a fabrication facility for fabricating semiconductor devices.

2. The method of claim 1, further comprising: patterning the re-arranged IC layout onto the blank reticle.

3. The method of claim 2, further comprising: manipulating the re-arranged IC layout in a global manner before the re-arranged IC layout is patterned onto the blank reticle.

4. The method of claim 1, wherein the defect information contains a location of the defect on the blank reticle.

5. The method of claim 1, wherein the determining that the defect will cause interference comprises determining, that some of the first features will intersect with the defect if the blank reticle is patterned with the IC layout.

6. The method of claim 1, wherein:
    the first features for which the defect will cause the interference include an interconnect element that would land on the defect if the blank reticle is patterned with the IC layout; and
    the re-arranging of the IC layout comprises detouring the interconnect element such that the detoured interconnect element goes around, but does not land on, the defect when the re-arranged IC layout is patterned onto the blank reticle.

7. The method of claim 1, wherein:
    the first features for which the defect will cause the interference include an interconnect element that would land on the defect if the blank reticle is patterned with the IC layout;
    the interconnect element is disposed in a first interconnect layer; and
    the re-arranging of the IC layout comprises:
        breaking the interconnect element into a first segment and a second segment separated by a gap corresponding to a location of the defect;
        creating a second interconnect element in a second interconnect layer above or below the first interconnect layer, the second interconnect element overlapping with the gap separating the first and second segments;

creating a first via that electrically interconnects the first segment with a first distal end of the second interconnect element; and creating a second via that electrically interconnects the second segment with a second distal end of the second interconnect element.

8. The method of claim 1, wherein:

the first features for which the defect will cause the interference include a first interconnect element and an adjacent second interconnect element that would both land on the defect if the blank reticle is patterned with the IC layout; and the re-arranging of the IC layout comprises detouring the first and second interconnect elements such that the detoured first and second interconnect elements partially surround, but do not land on, the defect when the re-arranged IC layout is patterned onto the blank reticle.

9. The method of claim 8, wherein:

the IC layout contains a third interconnect element disposed adjacent to the first interconnect element and a fourth interconnect element disposed adjacent to the second interconnect element;

the first and second interconnect elements are disposed between the third and fourth interconnect elements; and the re-arranging of the IC layout comprises detouring the third and fourth interconnect elements in a manner such that a first spacing between the detoured first and third interconnect elements and a second spacing between the detoured third and fourth interconnect elements each comply with spacing requirements set forth by design rules governing the IC layout.

10. A method, comprising:

receiving an integrated circuit (IC) layout, the IC layout containing first features and second features different from the first features;

receiving defect information of a blank reticle with respect to a defect of the blank reticle;

determining, based on the defect information and the IC layout, that the defect will cause interference with at least some of the first features if the blank reticle is patterned with the IC layout; and in response to the determining, re-arranging, by one or more electronic processors, the IC layout in a localized manner such that the defect will no longer cause interference with the first features of the re-arranged IC layout;

wherein:

the first features for which the defect will cause the interference include an interconnect element that would land on the defect if the blank reticle is patterned with the IC layout;

the interconnect element is disposed in a first interconnect layer; and the re-arranging of the IC layout is implemented in fabricating photomasks or is provided to a fabrication facility for fabricating semiconductor devices, and the re-arranging of the IC layout comprises:

breaking the interconnect element into a first segment and a second segment separated by a gap corresponding to a location of the defect;

creating a second interconnect element in a second interconnect layer above or below the first interconnect layer, the second interconnect element overlapping with the gap separating the first and second segments;

creating a first via that electrically interconnects the first segment with a first distal end of the second interconnect element; and creating a second via that electrically interconnects the second segment with a second distal end of the second interconnect element.

11. The method of claim 10, further comprising:

patterning the re-arranged IC layout onto the blank reticle; and manipulating the re-arranged IC layout in a global manner before the re-arranged IC layout is patterned onto the blank reticle.

12. The method of claim 10, wherein the defect information contains a location of the defect on the blank reticle.

13. The method of claim 10, wherein:

the first features for which the defect will cause the interference include a further interconnect element that would land on the defect if the blank reticle is patterned with the IC layout; and the re-arranging of the IC layout comprises detouring the further interconnect element such that the detoured further interconnect element goes around, but does not land on, the defect when the re-arranged IC layout is patterned onto the blank reticle.

14. The method of claim 10, wherein:

the first features for which the defect will cause the interference include a first further interconnect element and an adjacent second further interconnect element that would both land on the defect if the blank reticle is patterned with the IC layout; and the re-arranging of the IC layout comprises detouring the first and second further interconnect elements such that the detoured first and second further interconnect elements partially surround, but do not land on, the defect when the re-arranged IC layout is patterned onto the blank reticle.

15. The method of claim 14, wherein:

the IC layout contains a third further interconnect element disposed adjacent to the first further interconnect element and a fourth further interconnect element disposed adjacent to the second further interconnect element;

the first and second further interconnect elements are disposed between the third and fourth further interconnect elements; and the re-arranging of the IC layout comprises detouring the third and fourth further interconnect elements in a manner such that a first spacing between the detoured first and third further interconnect elements and a second spacing between the detoured third and fourth further interconnect elements each comply with spacing requirements set forth by design rules governing the IC layout.

16. A method, comprising:

receiving an integrated circuit (IC) layout, the IC layout containing first features and second features different from the first features;

receiving defect information of a blank reticle with respect to a defect of the blank reticle;

determining, based on the defect information and the IC layout, that the defect will cause interference with at least some of the first features if the blank reticle is patterned with the IC layout; and in response to the determining, re-arranging, by one or more electronic processors, the IC layout in a localized manner such that the defect will no longer cause interference with the first features of the re-arranged IC layout;

wherein:

the first features for which the defect will cause the interference include a first interconnect element and an adjacent second interconnect element that would both land on the defect if the blank reticle is patterned with the IC layout; and the IC layout contains a third interconnect element disposed adjacent to the first interconnect element and a fourth interconnect element disposed adjacent to the second interconnect element;

the first and second interconnect elements are disposed between the third and fourth interconnect elements; and the re-arranging of the IC layout is implemented in fabricating photomasks or is provided to a fabrication facility for fabricating semiconductor devices, the re-arranging of the IC layout comprising:

detouring the first and second interconnect elements such that the detoured first and second interconnect elements partially surround, but do not land on, the defect when the re-arranged IC layout is patterned onto the blank reticle; and detouring the third and fourth interconnect elements in a manner such that a first spacing between the detoured first and third interconnect elements and a second spacing between the detoured third and fourth interconnect elements each comply with spacing requirements set forth by design rules governing the IC layout.

17. The method of claim 16, further comprising patterning the re-arranged IC layout onto the blank reticle.

18. The method of claim 16, further comprising manipulating the re-arranged IC layout in a global manner before the re-arranged IC layout is patterned onto the blank reticle.

19. The method of claim 18, wherein the determining comprises determining that the interference caused by the defect cannot be avoided by the manipulating of the IC layout in the global manner.

20. The method of claim 16, wherein the defect information contains a location of the defect on the blank reticle.

* * * * *